(12) United States Patent
Lee (10) Patent No.: US 10,399,629 B2
(45) Date of Patent: Sep. 3, 2019

(54) FAIRING ASSEMBLY FOR MOTORCYCLE AND ADJUSTING APPARATUS FOR FAIRING AND METHOD FOR ADJUSTING FAIRING USING THE SAME (71) Applicant: Hyun-Eui Lee, Seoul (KR)

(72) Inventor: Hyun-Eui Lee, Seoul (KR)

( * ) Notice: Subject to any disclaimer, the term of this patent is extended or adjusted under 35 U.S.C. 154(b) by 0 days.

(21) Appl. No.: 15/705,110

(22) Filed: Sep. 14, 2017

(65) Prior Publication Data

US 2019/0054970 A1 Feb. 21, 2019

(30) Foreign Application Priority Data

Aug. 18, 2017 (KR) .......................... 10-2017-0104595

(51) Int. Cl.
*B62J 17/02* (2006.01)

(52) U.S. Cl.
CPC ..................... *B62J 17/02* (2013.01)

(58) Field of Classification Search
CPC ............. B62J 17/02; B62J 17/06; B62J 17/04

USPC ......................................................... 296/78.1
See application file for complete search history.

(56) References Cited

U.S. PATENT DOCUMENTS

| 2,903,297 | A | * | 9/1959 | Zbikowski | ............... | B62J 29/00 |
| | | | | | | 248/479 |
| 7,946,642 | B1 | * | 5/2011 | Wu | .......................... | B62J 17/04 |
| | | | | | | 296/78.1 |
| 9,211,933 | B2 | | 12/2015 | Lee | | |
| 9,561,831 | B2 | * | 2/2017 | Yaffe | ......................... | B62J 17/04 |
| 9,616,957 | B2 | * | 4/2017 | Yaffe | ......................... | B62J 17/04 |

FOREIGN PATENT DOCUMENTS

KR 2019990021269 3/2000

* cited by examiner

*Primary Examiner* — Dennis H Pedder
(74) *Attorney, Agent, or Firm* — Monami Law Group PLLC (57) ABSTRACT

A motorcycle fairing assembly includes: a fairing including an inner fairing and an outer fairing; and a fairing adjustment device which is provided between a motorcycle main body and the fairing and includes height adjuster for adjusting a coupling height of the fairing with respect to the motorcycle main body.

7 Claims, 8 Drawing Sheets

FAIRING ASSEMBLY FOR MOTORCYCLE AND ADJUSTING APPARATUS FOR FAIRING AND METHOD FOR ADJUSTING FAIRING USING THE SAME

TECHNICAL FIELD

The present invention relates to a motorcycle fairing assembly, a fairing adjust device, and a fairing adjusting method using the same. More particularly, the present invention relates to a motorcycle fairing assembly provided with an existing motorcycle fairing bracket in place of the existing motorcycle fairing bracket to adjust the fairing, in particular adjust of the fairing, and a fairing adjustment device thereof.

RELATED ART

Generally, a motorcycle has a component called a fairing in the front.

The fairing is provided in front of a motorcycle to provide a reduction in aerodynamic noise and air resistance. The fairing includes an inner fairing provided on the inner side and an outer fairing provided on the outer side.

Conventional motorcycles include fairing bracket for coupling a neck portion and a fairing corresponding to a joint portion of a motorcycle and a steering wheel. This fairing bracket serves to fix the fairing to the motorcycle body.

On the other hand, the height of the fairing with respect to the motorcycle body, the position of horizontal joining, and the like need to be changed or adjusted. However, since the conventional fairing bracket simply provides the fairing and the fixed connection between the main body and the main body, there is a limitation in that the fairing cannot be adjusted.

Korean utility model registration No. 20-0171876 (Dec. 7, 1999), which is a prior art for starting a motorcycle fairing, discloses a safety device for a motorcycle. This art does not suggest an alternative to adjust the above problem of the fairing.

SUMMARY OF THE INVENTION

Problems to be Solved

The present invention has been made to solve the above-mentioned problems, and it is an object of the present invention to provide a motorcycle fairing assembly having a fairing adjustment device for replacing a conventional motorcycle fairing bracket, and to provide a method for adjusting fairing using the same.

Means for Solving the Problems

A fairing assembly according to the present invention includes: a fairing including an inner fairing and an outer fairing; and a fairing mechanism provided between the motorcycle body and the fairing, the fairing including height adjuster for adjusting the height of the coupling with respect to the motorcycle body.

According to another aspect of the present invention, there is provided a fairing adjust apparatus including a first body having a first engaging portion coupled to a fairing, a second body having a second engaging portion coupled to the first body, And a height adjuster for adjusting a height of the first body with respect to the second body.

According to another aspect of the present invention, there is provided a method of adjusting a fairing, the method comprising: separating the fairing from a fairing bracket provided between the main body and the fairing; separating the fairing bracket from the main body; Adjusting the height of the coupling of the fairing through the height adjuster, and coupling the fairing to the fairing adjustment device.

Effects of the Invention

According to the present invention having the above-described configuration, it is possible to adjust the fairing, in particular, to adjust the height of the fairing so that the fairing height can be adjusted to match the user's preference.

DETAILED DESCRIPTION OF ILLUSTRATIVE EMBODIMENTS

The present invention provides a motorcycle fairing assembly which is provided in place of a conventional motorcycle fairing bracket to provide a fairing adjust, particularly a fairing adjust device for adjusting the height of the fairing, and method for adjusting a fairing.

Hereinafter, a motorcycle fairing assembly (hereinafter referred to as an 'present assembly'), a fairing adjust device (hereinafter referred to as the 'present device A') and a fairing adjust method (hereinafter referred to as an 'present method') will be explained in detail.

Referring first to the assembly, the assembly generally includes a fairing (not shown) and fairing adjustment device A.

The fairing includes an inner fairing and an outer fairing. The fairing is provided in front of the motorcycle to provide a reduction of aerodynamic noise and air resistance. The detailed description thereof will be omitted.

However, in the present invention, the fairing comprises a double powder, an inner fairing is provided on the inner side of the outer fairing, and an outer fairing is provided on the outer side of the inner fairing.

Next, the fairing adjustment device A is provided between the motorcycle body and the fairing. A typical motorcycle is equipped with a fairing bracket for coupling the fairing and the motorcycle body. Particularly, the fairing bracket is connected to the Neck Portion of the body of the motorcycle so that the fairing is fixed. The fairing adjustment device A of the present invention is installed in place of the fairing bracket, and enables adjustment of the fairing.

The present assembly is a combination of the fairing and fairing adjust device A. The assembly is characterized in that the fairing adjust device A includes height adjuster 3 for adjusting the engagement height of the fairing with respect to the motorcycle body.

Through the height adjuster 3, the height of the fairing with respect to the motorcycle body can be adjusted. Therefore, the height of the fairing can be set according to the user's preference. Also, according to the preference of the user, it is possible to provide the user with fairing suitable for the tuning of the motorcycle.

Figure 1:
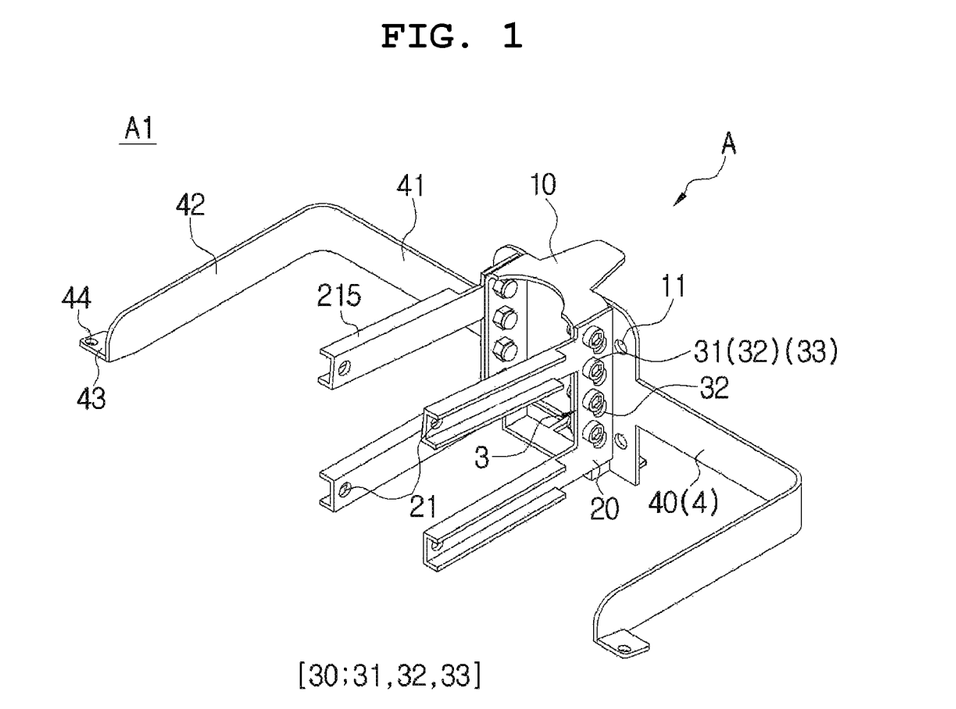
FIG. 1 is a perspective view of a fairing adjusting apparatus according to a first embodiment of the present invention.
Figure 2:
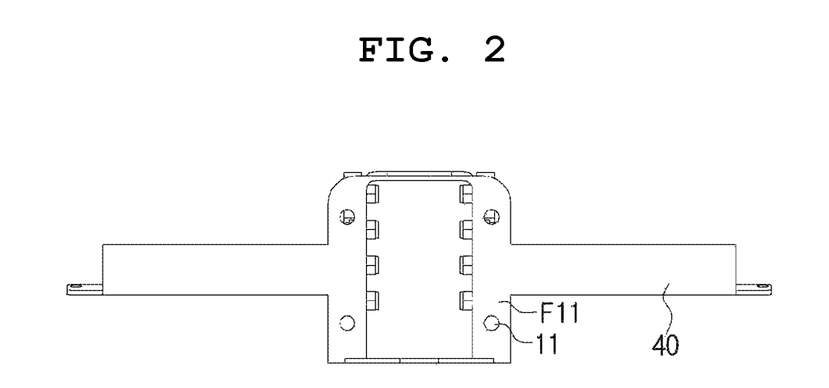
FIG. 2 is a front view of the fairing adjusting apparatus according to the first embodiment of the present invention.
Figure 3:
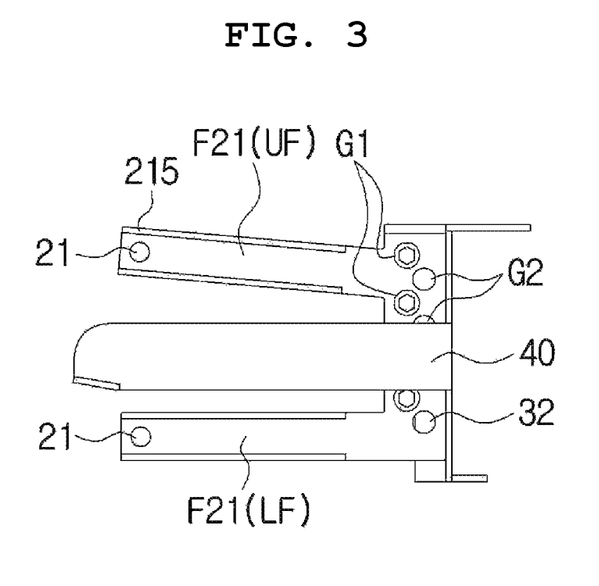
FIG. 3 is a side view of the fairing adjusting apparatus according to the first embodiment of the present invention.
Figure 4:
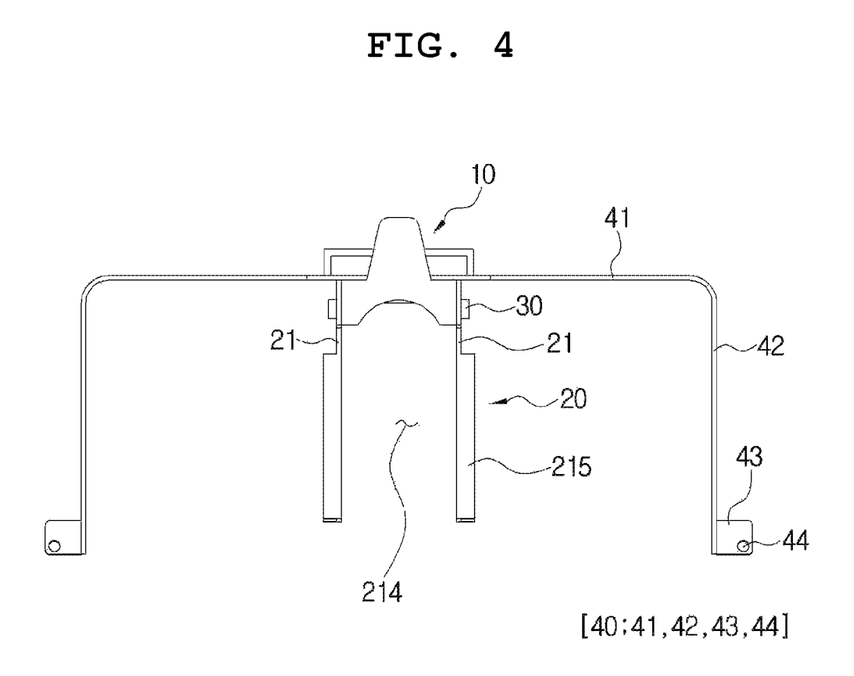
FIG. 4 is a plane view of the fairing adjusting apparatus according to the first embodiment of the present invention.

FIGS. 1 to 5 are diagrams showing a fairing adjusting apparatus A1 according to a first embodiment of the present invention. FIG. 1 is a perspective view, FIG. 2 is a front view, FIG. 3 is a side view, and FIG. 4 is a plane view.

Figure 6:
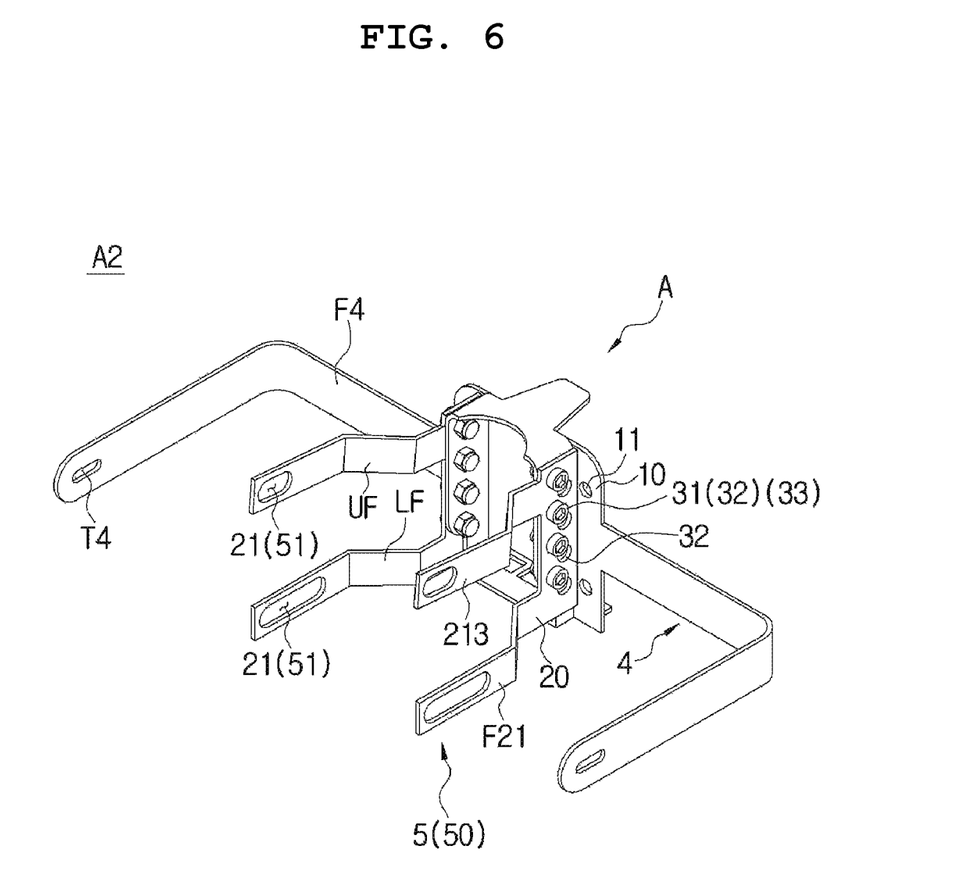
FIG. 6 is a perspective view of the fairing adjusting apparatus according to the second embodiment of the present invention.
Figure 7:
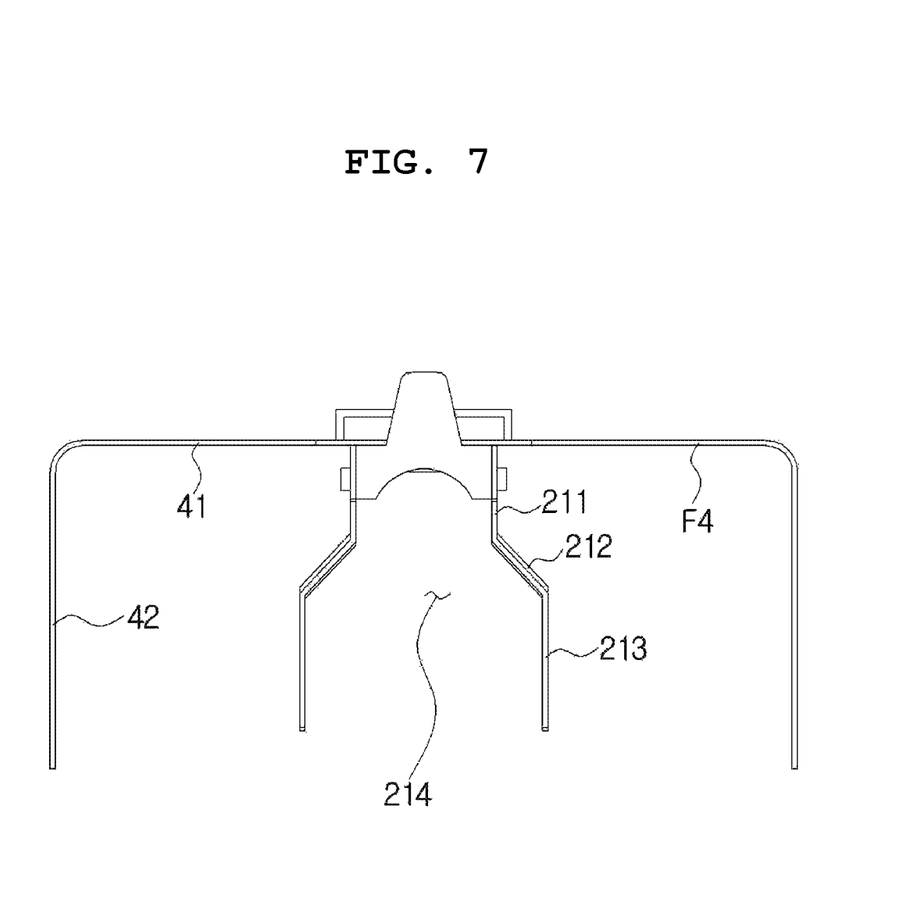
FIG. 7 is a plane view of the fairing adjusting apparatus according to the second embodiment of the present invention.

FIGS. 6 and 7 are views showing a fairing adjusting apparatus A2 according to a second embodiment of the present invention. FIG. 6 is a perspective view, and FIG. 7 is a plan view.

Hereinafter, more specific features of the present assembly will be described with reference to FIGS. 1 to 7.

First, the assembly includes a plurality of fairing side first engagement holes 31 in which height adjusting mean 3 is vertically arranged, a plurality of vertically arranged body side second engagement holes 32, and a coupling member 33 inserted into the coupling hole 31 and the second coupling hole 32.

Specifically, a plurality of first engagement holes 31 and second engagement holes 32 are vertically arranged. At FIGS. 1 to 5, the first and second coupling holes 31 and 32 and the coupling member 33 are shown at the same place so that the first and second coupling holes 31 and 32 cannot be shown in detail. At FIG. 1, a part of the second coupling hole 32 is shown, and the first and second coupling holes 31 and 32 are provided in the place where the coupling member 33 is provided through FIGS. 1 to 5.

Accordingly, any one of the plurality of first coupling holes 31 and one of the plurality of second coupling holes 32 may be aligned with each other and then fixed through the coupling member 33 to increase the height between the main body, therefore the fairing can be adjusted.

As shown in FIGS. 1 to 7, the assembly includes a first group G1 in which first and second coupling holes 31 and 32 are arranged perpendicular to the first column, And a second group (G2) arranged perpendicularly to a second column which is parallel to the first column.

Referring to FIG. 3, which best shows the above characteristics, of the present assembly comprises a first group G1 in which the second coupling holes 32 are arranged in the first column and a second group G2 arranged in the second column which is parallel to the first column. Also, when the second coupling holes 32 for adjusting the height between the main assembly and the fairing are selected in the first group G1, the first coupling holes 31 are also selected in the first group G1. When the second coupling hole 32 is selected in the second group G2, the first coupling hole 31 is also preferably selected in the second group G2.

The first and second coupling holes 31 and 32 are preferably divided into two groups in consideration of a space occupied by the first and second coupling holes 31 and 32. However, three groups are also possible.

With the multi-row engagement holes, the present invention can also adjust the horizontal distance of fairing with the main body.

As shown in FIGS. 1 to 7, the assembly includes a first group G1 and a second group G2 of the first and second coupling holes 31 and 32 can be arranged in different horizontal Position. That is, the first and second coupling holes 31 and 32 can be arranged in a zigzag shape.

Referring to FIG. 3, the coupling holes of the first group G1 is disposed on the uppermost portion, and the coupling holes of the second group G2 are disposed below the diagonal line. In other words, the second coupling hole 32 has a zigzag shape as a whole. The first coupling holes 31 can also be arranged in the same manner.

With the zigzag arrangement holes, the present invention can adjust the horizontal position of the fairing. And more delicate height adjustment is possible. In the case of vertically arranging the engagement holes, it is not possible to adjust the height of the engagement hole to a distance smaller than the diameter of the engagement hole. However, when the engaging holes are disposed in a staggered manner as described above, the height of the engaging holes can be adjusted with height smaller than the diameter of the engaging holes.

On the other hand, the present assembly is characterized in that the fairing adjusting device A further includes an engaging support 4 for supporting the coupling between the fairing adjusting device A and the fairing to reduce the vibration generated in the fairing.

Specifically, as shown in FIGS. 6 to 7, which are the second embodiment of the present invention, the engaging support 4 may include an anti-vibration frame F4 coupled to the inner surface of the inner fairing.

Referring to FIG. 6, the anti-vibration frame F4 includes a fixing portion T4 for coupling with the inner fairing. The fixing portion T4 can be a bolt hole which a bolt is inserted, or can be the bolt. It is further preferable that the fixing portion T4 is formed in such a shape that one diameter is longer than the other diameter so as to allow a margin for the coupling tolerance.

With the coupling support 4 (anti-vibration frame F4), the present invention can strengthen the resistance against vibration by imparting rigidity to the inner fairing. The coupling between the fairing regulating device A and the fairing, more specifically, the coupling between the fairing regulating device A and the inner fairing are made firm, thereby preventing the vibration of the fairing in driving by wind.

On the other hand, the present assembly is characterized in that the fairing adjusting device A further comprises a length adjuster 5 for adjusting the horizontal joining position of the fairing with respect to the main body.

As shown in FIGS. 6 to 7, the length adjuster 5 may include a slot 51 provided at a coupling portion with the main body.

As shown in FIG. 6, the slot 51 is provided at the coupling portion with the main body, that is, at the rear end of the fairing adjustment device A. These slots 51 allow the horizontal joining position of the fairing to the body to be adjusted. This results in fine tuning of the fairing and provides room for various motorcycle specifications.

A specific structure of the fairing adjust apparatus A according to the present invention, that is, the present apparatus A will be described with reference to FIG. 1 to FIG. 7. Hereinafter, a description will be made of a brief description of the parts overlapping with the description of the present assembly, and a description of the present assembly will be referred to for the parts where the description is omitted or reduced.

The apparatus A includes a first body 10, a second body 20, and a height adjuster 30, which are provided between the main body of the motorcycle and the fairing to support and adjust the fairing.

As shown in FIGS. 1 to 7, the first body 10 has a first coupling portion 11 coupled to the fairing, and is coupled to the second body 20. As shown in FIG. 2, it is preferable that the first coupling portion 11 can be a bolt hole or the bolt. The bolt hole is formed in front of the main frame F11, and the first coupling portion 11 is preferably bolted to the inner fairing, particularly in the fairing.

Next, as shown in FIGS. 1 to 7, the second body 20 has a second coupling portion 21 coupled to the first body 10. As shown in FIG. 3, it is preferable that the second coupling portion 21 is formed of a bolt hole or a bolt itself. The bolt hole is formed in the rear of the coupling frame F21, and the second coupling portion 21 is preferably bolted to the neck or a bolt of the steering shaft changing device.

Next, the height adjusting section 30 is a configuration for realizing the height adjuster 3 of the present assembly. The height adjuster 30 adjusts the height of the fairing with respect to the body by adjusting the height of the first body 10 with respect to the second body 20. The height adjuster 30 may provide a height of fairing that matches the user's preference. Further, the height adjusting portion 30 provides an effect of having height suitable for tuning the motorcycle according to the user's preference.

Referring to FIGS. 1 to 7, the height adjuster 30 will be described in more detail. The apparatus A includes a plurality of first coupling holes 31 vertically arranged in the first body 10, and a plurality of second coupling holes 30 vertically arranged in the second body 20, and a coupling member 33 penetratingly inserted into the first coupling hole 31 and the second coupling hole 32.

The above features have been mentioned in the above description of the assembly, and redundant description will be omitted.

However, since the first body 10 is a portion to be coupled to the fairing, the first coupling hole 31 provided on the fairing side is formed on the first body 10. Since the second body 20 is a part coupled to the main body, the second coupling hole 32 provided on the main body side is formed in the second body 20.

The apparatus A further includes a first group G1 in which the first and second engaging holes 31 and 32 of the height adjusting section 30 are arranged perpendicular to the first row and a second group G2, and a second group G2 arranged perpendicularly to a second row which is parallel to the first row.

The first and second groups G1 and G2 of the height adjustment unit 30 of the apparatus A are not identical to each other in the first and second coupling holes 31 and 32 so that the first and second coupling holes 31 and 32 can be arranged in a zigzag form.

Meanwhile, the apparatus A may further include a coupling support portion 40 for supporting coupling between the first body 10 and the fairing.

The coupling support portion 40 is a structure for realizing the coupling support 4 of the main assembly described above. The coupling support 40 provides rigidity to the inner fairing, thereby enhancing the resistance to vibration, as well as strengthening the coupling between the fairing adjustment device A and the fairing, more specifically, between the fairing adjustment device A and the inner fairing, Preventing flickering of fairing.

Particularly, the present device A is characterized in that the coupling support portion 40 is coupled to the inner surface of the inner fairing. By virtue of this feature, it is possible to apply the coupling support portion 40 without separating the inner fairing and the outer fairing, thereby providing an effect of greatly improving the convenience of the operator.

As shown in FIGS. 1 to 7 (particularly, FIG. 4), the engaging support portion 40 comprises a first support body extended laterally of the first body 10, and a second support body 42 extending rearward from the first support body 41.

The first support body 41 provides a anti-vibration effect on the front portion of the fairing and the second support body 42 provides a anti-vibration effect on the side portions of the fairing. Accordingly, it is preferable that the first support body 41 contacts the front portion of the inner fairing and the second support body 42 contacts the lateral portion of the inner fairing.

The coupling support portion 40 is completely fixed to the inner fairing by the fixing portion T4 formed on the second support body 42.

In another embodiment of the engagement support 40, as shown in FIGS. 1 to 5, the engagement support 40 can comprise a fixed body 43 extends laterally and horizontally from the second support body 42, and a fixing hole 44 formed in the fixing body 43 and perforated in the vertical direction.

Figure 5:
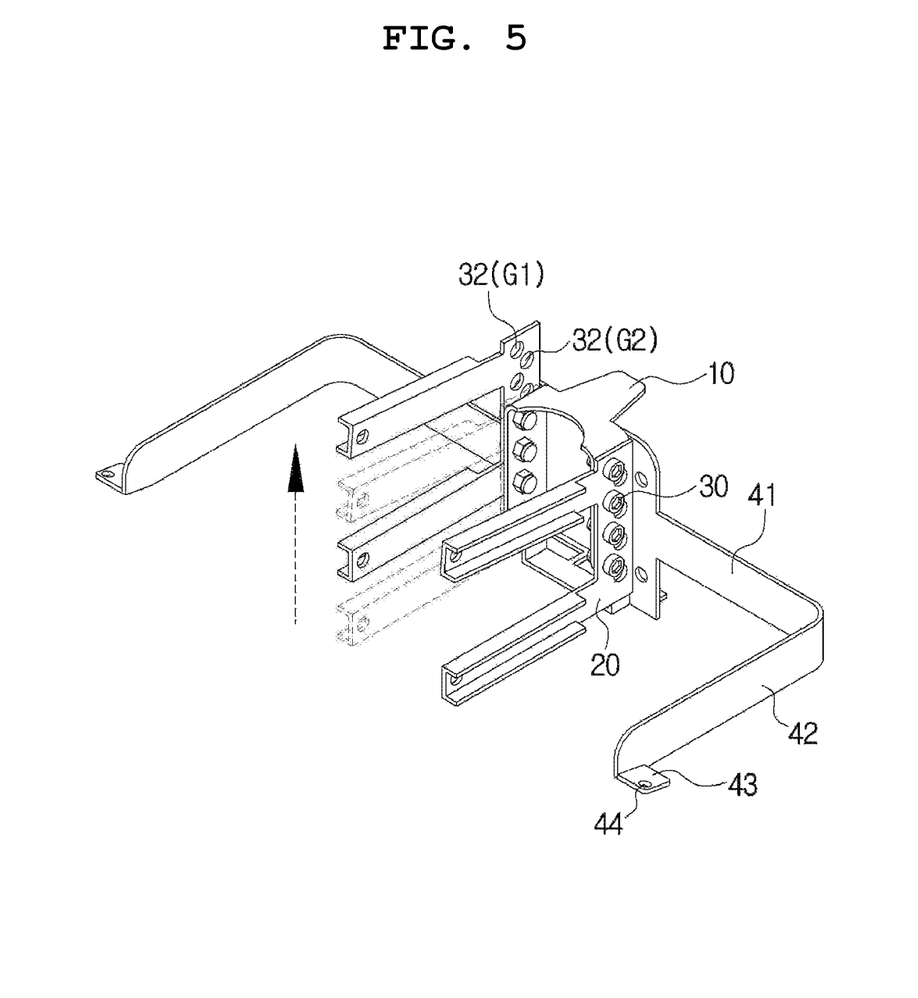
FIG. 5 is a use state diagram relating to the fairing adjusting apparatus according to the first embodiment.

As shown in FIGS. 4 and 5, the fixed body 43 is laterally and horizontally arranged from the second support body 42. As shown in FIG. 5, this means that, assuming that the thickness is thinner than the width as shown in FIG. 5, the main surface (surface generating the width) is arranged to face upward. The horizontal arrangement of the fixing bodies 43 allows the fixing holes 44 to be perforated in the vertical direction, that is, in the vertical direction.

The fixing hole 44, which is perforated in the up-and-down direction, causes the fixing hole 44 to be positioned in the bolt hole space between the inner fairing and the outer fairing. Therefore, coupling between the present apparatus A and the inner fairing is made possible without drilling a hole in the inner fairing.

In the second embodiment described above, the fixing portion T4 is perforated in the lateral direction, so that it is necessary to carry out the operation of perforating the hole in the inner fairing for the connection with the inner fairing. However, the engagement support portion 40 in the first embodiment can omit the operation of piercing holes in the inner fairing, thereby providing advantages such as durability enhancement, workability improvement.

Further, with the horizontal arrangement of the fixed body 43, the first and second support bodies 41 and 42 can support the inner side of the fairing. Then, the fixed body 43 supports the lower surface of the fairing, so that the anti-vibration effect of the fairing can be further improved.

The apparatus A may further include a length adjusting unit 50 for adjusting the horizontal joining position of the fairing with respect to the motorcycle body.

The length adjusting section 50 is a configuration for realizing the length adjuster 5 described above. The second coupling portion 21 may include a coupling frame F21 protruding rearward and the length adjusting portion 50 may include a slot 51 formed at the rear end of the second coupling portion 21.

Since the configuration of the length adjuster 50 has already been described in the above-described assembly, a detailed description thereof will be omitted.

The present apparatus A includes a coupling frame F21 constituting the second coupling portion 21 includes an upper frame UF and a lower frame LF arranged parallel to the upper frame UF and an elongated hole 51 constituting the length adjusting portion 50 is formed on both the upper frame UF and the lower frame LF. In addition, the upper frame UF and the lower frame LF are each arranged in parallel to each other. Thus, four slots 51 may be provided.

With the above feature, the present invention can flexibly cope with design tolerances and errors in product specifications by adjusting the length in each of the four long holes 51. And it is possible to effectively prevent deterioration of bonding stability with the main body accompanied by the length adjustment.

As shown in FIGS. 6 to 7, the apparatus A according to the second embodiment of the present invention is configured such that the coupling frame F21 constituting the second coupling portion 21 is connected to the second body 20, a second frame portion 212 extending rearward from the first frame portion 211, and a third frame portion 213 extending rearward from the second frame portion 211. And a space 214, which is an inner space formed by the first to third frame parts 211, 212, and 213, respectively. And the second frame portion 212 is inclined in a direction to widen the size of the space portion 214 toward the rear side.

This enlarges the size of the space portion 214 so that additional components can be installed in the fairing bracket. For example, an additional configuration, such as the steering shaft changing device of U.S. Pat. No. 9,211,933, the applicant's existing registered patent.

As another still further feature, the present apparatus A has a structure in which the upper frame UF of the engaging frame F21 constituting the second engaging portion 21 has a slope such that the vertical position thereof increases as it goes backward.

The feature of the upper frame UF having the inclination is to provide a structure suitable for applying the steering shaft changing device of the above-mentioned applicant's existing registered U.S. Pat. No. 9,211,933. [NOTE: Please submit this reference as IDS.]

As a further feature, the apparatus A may further include a rigidity strengthening section 215 in which a coupling frame F21 constituting the second coupling section 21 is provided.

As shown in FIGS. 1 to 5, the rigidity strengthening portion 215 may be provided on both the upper frame UF and the lower frame LF. The rigidity reinforcing portion 215 may be formed by bending the upper and lower ends of each frame outwardly. The rigidity reinforcing portion 215 enhances the rigidity of the coupling frame F21 to contribute to improvement in durability and further provides an effect of strengthening the coupling strength with the main body.

Hereinafter, the third to fifth embodiments, which are modifications of the present invention, will be described with reference to FIGS. 8 to 10.

In the third embodiment of the present invention, the fairing adjusting device A3 is not provided with the height adjusting part 30 but only the coupling supporting part 40 is provided. When the fairing adjusting device A3 according to the third embodiment is provided, the fairing assembly will also be provided with only the engaging support 4.

Figure 8:
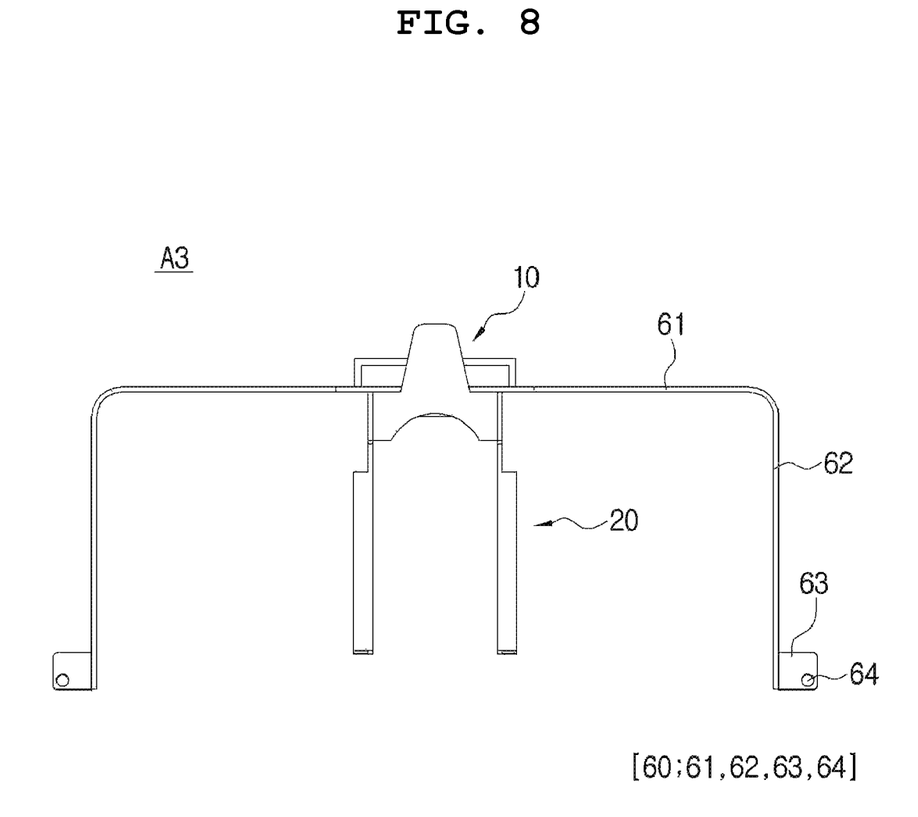
FIG. 8 is a third embodiment of the present invention.

As shown in FIG. 8, the apparatus A3 according to the third embodiment includes the first body 10 and the second body 20 together with the first body 10 and the second body 20 described above, And a coupling support portion 40 for supporting coupling between the fairings. For convenience of explanation, the joint support portion 40 according to the third embodiment will be referred to as a first support wing portion 60.

As shown in FIG. 8, the first supporting wing portion 60 is an 'integral coupling supporting portion'. The first supporting wing portion 60 includes a first supporting body 61 extending laterally from the first body 10; a second support body 62 extending rearward from the body 61; a fixed body 63 extending laterally from the second support body 62 and horizontally disposed; and fixing hole 64 formed on the fixed body 63 and penetrated vertically.

The effect of the first support vane 60 is the same as that of the coupling support 40 described above. However, in the third embodiment, it is meaningful that the apparatus A3 can be carried out in a manner that the height adjusting section 30 is omitted and only the engaging support section 40 is provided.

The fourth embodiment of the present invention is characterized in that the fairing adjusting device A4 does not have the height adjusting part 30 but only the engaging and supporting part 40 in the present invention.

Figure 9:
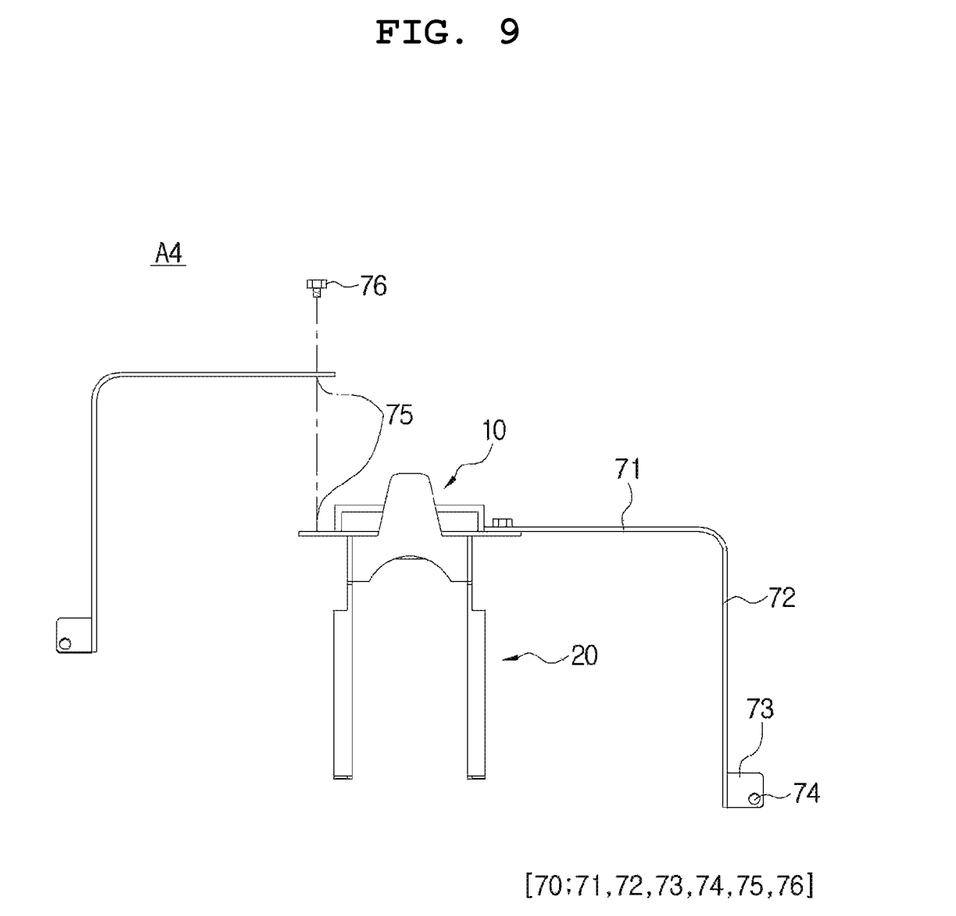
FIG. 9 is a fourth embodiment of the present invention.

As shown in FIG. 9, the apparatus A4 according to the fourth embodiment includes the first body 10 and the second body 20 together with the first body 10 and the second body 20 described above, And an engaging support portion 40 for supporting the engagement between the engaging portion and the fairing, wherein the engaging support portion 40 further includes a detachable engaging device. For convenience of explanation, the engagement support portion 40 according to the fourth embodiment will be referred to as a second support wing portion 70.

As shown in FIG. 9, the second support vane 70 is a 'detachable coupling support', which includes a first support body 71 disposed laterally, a second support vane 71 at a side end of the first support body 71, A fixed body 73 horizontally extending and extending laterally from a rear end of the second support body 72 and a second body 72 formed in the fixed body 73 to be vertically punched And a fixing hole 74 which is formed in the base plate. A through hole 75 formed in the first supporting body 71 and the first body 10 and a through hole 75 penetratingly inserted into the through hole 75 to connect the first supporting body 71 and the first body 10.

The effect of the second support vane portion 70 is the same as that of the engagement support portion 40 described above. However, the fourth embodiment is meaningful in that the engaging and supporting portion 40 can be separated from the bodies 10 and 20 according to various design specifications and manufacturing environments. For example, it is possible to dispose only the body 10, 20 from the fairing in a state where the coupling support 40 is provided only on one side of the body 10 or 20 or the coupling support 40 is fixed on the fairing be possible.

The fifth embodiment of the present invention is characterized in that the fairing adjusting device A5 is provided with only the engaging and supporting portion 40 without the height adjusting portion 30 and the engaging and supporting portion 40 is supported by the body 10, and is independently provided.

Figure 10:
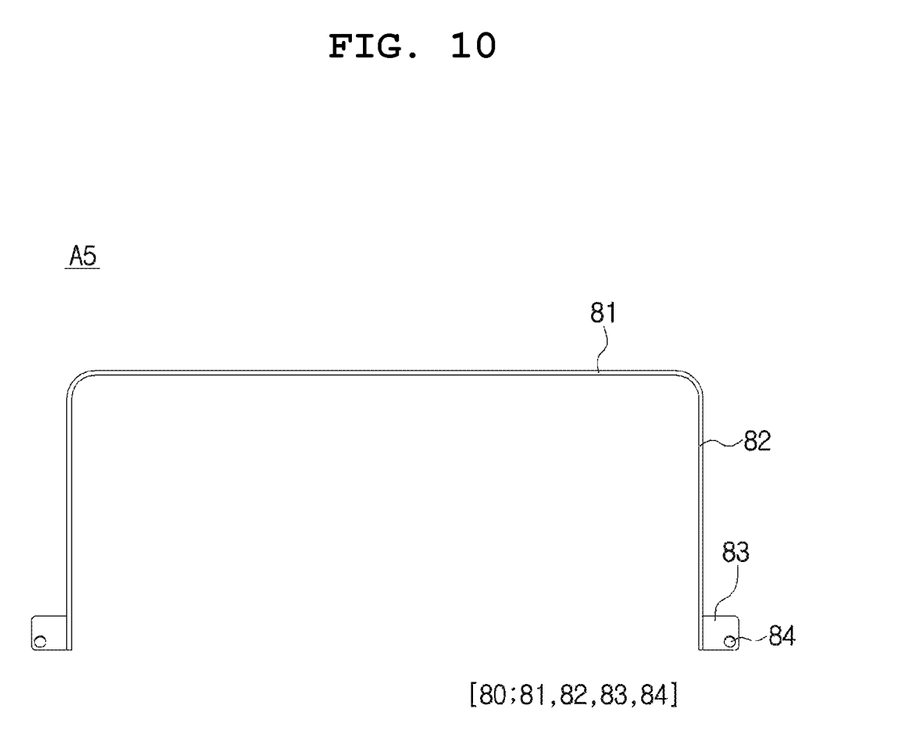
FIG. 10 is a fifth embodiment of the present invention.

As shown in FIG. 10, the apparatus A5 according to the fifth embodiment includes the first body 10 and the second body 20 together with the first body 10 and the second body 20 described above, and a coupling support portion 40 for supporting a coupling between the coupling portions 40 and the fairing. The coupling support portion 40 is spaced apart from the bodies 10 and 20. For convenience of description, the coupling support portion 40 according to the fourth embodiment will be referred to as a third support wing portion 80.

As shown in FIG. 10, the third supporting wing portion 80 is a 'independent coupling supporting portion'. The third supporting wing portion 80 includes a first supporting body 81 disposed laterally, a second supporting body 81 disposed at the side end of the first supporting body 81, and a fixed body 83 extending horizontally and extending laterally from the rear end of the second support body 82 and a second fixed body 83 formed horizontally in the fixed body 83, and is fixed to the first body 10 and the second body 20 and is independently coupled to the fairing (particularly, the inner side of the fairing).

The effect of the third support vane portion 80 is the same as that of the coupling support portion 40 described above. However, in the fifth embodiment, it is meaningful that the bodies 10 and 20 may be omitted and the coupling support 40 alone may be provided as necessary.

Hereinafter, the fairing adjustment method according to the present invention will be described in detail.

The method includes the fairing adjusting device A, which is provided between the motorcycle body and the fairing, and includes height adjuster 3 for adjusting the joining height of the fairing with respect to the motorcycle body. The method includes a fairing separation step (S1), a fairing bracket separating step (S2), a fairing adjustment device coupling step (S3), a height adjustment step (S4), and a fairing reuniting step (S5).

For each step, the fairing separation step (S1) is a step of separating the fairing from the fairing bracket provided between the main body and the fairing, which corresponds to the preprocessing for separating the fairing bracket.

Next, the fairing bracket separating step (S2) is a step of separating the fairing bracket from the main body, and removing the fairing bracket so that the apparatus A can replace the fairing bracket.

Next, the fairing adjusting device attaching step (S3) is a step of coupling the fairing adjusting device to the main body instead of the fairing bracket removed in the step (S2). As described in the description of the present apparatus A, the second coupling portion 21 is coupled to the main body, and the length adjusting portion 50 described above can be utilized.

Next, the height adjusting step S4 is a step of adjusting the joining height of the fairing through the height adjuster 3. The installation height of the fairing with respect to the main body can be adjusted through the selection of the first coupling hole 31 and the second coupling hole 32, as described in the description of the present apparatus (A).

Next, the fairing reuniting step (S5) is a step of coupling the fairing to the fairing adjustment device. As mentioned in the description of the present apparatus A, it is preferable to couple the fairing to the first coupling portion 11, and particularly, the first coupling portion 11 is preferably coupled to the inner side of the inner fairing.

The present invention, including the above steps, replaces an existing motorcycle fairing bracket to provide a fairing adjustment device. By adjusting the installation height and horizontal position of the fairing, it is possible to apply to various motorcycle models, to customize according to the preference of the user, and to secure the margin for additional configuration.

In a further feature of the present invention, the method is characterized in that it may further comprise the step of coupling the fairing to the fairing regulating device, that is to say the fairing recombination step (S5), and the joining height recalibration step (S6).

In the step (S6), the step (S6) is a step of checking the coupling height of the fairing, separating the fairing from the fairing adjustment device, and resizing the coupling height of the fairing. The process of re-adjusting the coupling height of the fairing is performed in the same manner as in the above step (S4), and a more accurate fairing height can be ensured through this step S6.

In detail, the method comprises a plurality of first engagement holes 31 in which the height adjuster 3 are arranged in a row perpendicular to the fairing-side first body 10, a plurality of first body—A plurality of second engagement holes 32 arranged vertically in the first and second engagement holes 31 and 20 and an engagement member 33 penetratingly inserted into the first engagement hole 31 and the second engagement hole 32.

In yet another more particular aspect, the method includes adjusting the height of the fairing adjustment device via the height adjuster 3, i.e., adjusting the height (S4) of the second body (10) relative to the first body Wherein the first and second coupling holes 31 and 32 corresponding to the set coupling heights are selected, the coupling member 33 is connected to the selected first and second coupling holes 31 and 32, (31) and (32), respectively.

What is claimed is:

1. A motorcycle fairing assembly comprising:
    a fairing adjustment device (A) provided for a main body of a motorcycle and a fairing,
    wherein the fairing adjustment device (A) includes a height adjuster (3) adjusting a coupling height for the fairing,
    wherein the fairing adjustment device (A) further includes a first body (10) and a second body (20),
    wherein the height adjuster (3) comprises:
        first coupling holes (31) provided in the first body (10), wherein the first coupling holes (31) are formed at different levels from each other,
        second coupling holes (32) provided in the second body (20), wherein the second coupling holes (32) are formed at different levels from each other, and
        a coupling member (33) inserted through one of the first coupling holes (31) and one of the second coupling holes (32),
    wherein the first body (10) and the second body (20) are coupled to each other by the coupling member (33),
    wherein the first coupling holes (31)
    and the second coupling holes (32) are arranged in a zigzag pattern.

2. The motorcycle fairing assembly of claim 1,
    wherein the fairing adjustment device (A) further comprises a length adjuster (5) for adjusting a horizontal distance between the fairing and the main body of the motorcycle,
    wherein the length adjuster (5) includes a slot (51),
    wherein the slot (51) is provided at a rear end of the fairing adjustment device (A).

3. A motorcycle fairing adjustment device provided for a main body of a motorcycle and a fairing, comprising:
    a first body (10) provided for the fairing and having a first coupling portion (11);
    a second body (20) provided for the main body, coupled to the first body (10), and having a second portion (21); and
    a height adjusting portion (30) coupling the first body (10) to the second body (20) and adjusting a height of the first body (10) relative to the second body (20),
    wherein the height adjusting portion (30) comprises:
        first coupling holes (31) formed in the first body,
        second coupling holes (32) formed in the second body, and a coupling member (33) inserted through one of the first coupling holes (31) and one of the second coupling holes (32),
wherein the first coupling holes (31) and the second coupling holes (32) are arranged in a zigzag pattern.

4. The motorcycle fairing adjustment device of claim 3, further comprising:
a coupling support (4) provided for the first body (10) and the fairing,
wherein the coupling support (4) comprises:
a first support body (71) extending laterally from the first body (10), and
a second support body (72) extending rearward from the first support body (71).

5. The motorcycle fairing adjustment device according to claim 4, wherein the coupling support (4) further comprises:
a fixing body (43) extending laterally from the second support body (72), and
a fixing hole (44) formed through the fixing body (43).

6. A motorcycle fairing adjustment device, which is provided for a main body of a motorcycle and a fairing, comprising:
a first body (10) provided for the fairing and having a first coupling portion (11);
a second body (20) provided for the main body, coupled to the first body (10), and having a second portion (21); and
a height adjusting portion (30) coupling the first body (10) to the second body (20) and adjusting a height of the first body (10) relative to the second body (20),
wherein the height adjusting portion (30) comprises:
first coupling holes (31) formed in the first body (10),
second coupling holes (32) formed in the second body (20), and
a coupling member (33) inserted through one of the first coupling holes (31) and one of the second coupling holes (32),
wherein the motorcycle fairing adjustment device further comprising, a length adjuster (5) provided for adjusting a distance between the fairing and the main body of the motorcycle,
wherein the second coupling portion (21) includes an engaging frame (F21) protruding rearward,
wherein the length adjuster (5) includes a slot (51) formed at a rear end of the second coupling portion (21).

7. The motorcycle fairing adjustment device of claim 6, wherein the engaging frame (F21) includes an upper frame (UF) and a lower frame (LF),
wherein the lower frame (LF) is arranged in parallel to the upper frame (UF),
wherein the slot is formed in both the upper frame and the lower frame.

* * * * *